United States Patent
Castelnuovo

(10) Patent No.: US 11,487,905 B2
(45) Date of Patent: Nov. 1, 2022

(54) ELECTRONIC DEVICE AND CORRESPONDING METHOD OF OPERATION

(71) Applicant: STMicroelectronics S.r.l., Agrate Brianza (IT)

(72) Inventor: Andrea Castelnuovo, Cernusco Lombardone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 254 days.

(21) Appl. No.: 16/903,229

(22) Filed: Jun. 16, 2020

(65) Prior Publication Data

US 2020/0394338 A1    Dec. 17, 2020

(30) Foreign Application Priority Data

Jun. 17, 2019   (IT) .................. 102019000009165

(51) Int. Cl.
    *G06F 21/72*      (2013.01)
    *H04L 9/32*      (2006.01)

(52) U.S. Cl.
    CPC ............ *G06F 21/72* (2013.01); *H04L 9/3236* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 6,219,791 B1 | 4/2001 | Blanchard et al. | |
| 6,523,115 B1 | 2/2003 | Ono et al. | |
| 2006/0120521 A1* | 6/2006 | Whitehead | H04L 9/0662 380/46 |
| 2018/0103017 A1* | 4/2018 | Wang | H04L 9/0825 |
| 2018/0244238 A1* | 8/2018 | Shah | H04L 12/40045 |
| 2019/0334711 A1* | 10/2019 | Rodriguez De Castro | H04L 9/3239 |
| 2020/0177375 A1* | 6/2020 | Buck | H04L 9/0847 |

FOREIGN PATENT DOCUMENTS

CN      108269610 A      7/2018

* cited by examiner

*Primary Examiner* — Nelson S. Giddins
(74) *Attorney, Agent, or Firm* — Slater Matsil, LLP

(57) ABSTRACT

An electronic device such as a hardware security module device comprises a first cryptographic processing circuit configured to receive input data packets and apply thereto a first cryptographic processing to provide output data packets. A second cryptographic processing circuit is provided in the device, configured to receive the output data packets, apply thereto a second cryptographic processing inverse to the first cryptographic processing, and provide comparison data packets as a result of applying the second cryptographic processing to the output data packets received. A comparison processing circuit in the device is configured to compare the input data packets with the comparison data packets, and to produce an error signal as a result of the input data packets being different from the comparison data packets.

16 Claims, 1 Drawing Sheet

ELECTRONIC DEVICE AND CORRESPONDING METHOD OF OPERATION

CROSS-REFERENCE TO RELATED APPLICATIONS

This application claims the benefit of Italian Patent Application No. 102019000009165, filed on Jun. 17, 2019, which application is hereby incorporated herein by reference.

TECHNICAL FIELD

The description relates to techniques for providing functional safety in cryptographic hardware.

BACKGROUND

One or more embodiments may relate to a Hardware Security Module (HSM) implementing cryptographic functions with improved robustness against hardware random faults, i.e., improved functional safety.

SUMMARY

Hardware security modules providing security functions (i.e., functions related to protection of valuable data and/or information) may conventionally not be designed to fulfill functional safety requirements (i.e., requirements concerning the probability of system failures which may lead to hazards for the users).

In various applications, such as in the automotive field, hardware security modules (HSMs) with improved functional safety (e.g., ASIL-B compliant) are desirable.

An object of one or more embodiments is to contribute in providing hardware security modules with improved robustness against hardware random faults, with small or no impact on hardware redundancy.

According to one or more embodiments, such an object can be achieved by means of an electronic device (e.g., a hardware security module device) having the features set forth in the claims that follow.

One or more embodiments may relate to a corresponding method of operating the electronic device.

The claims are an integral part of the technical teaching provided herein in respect of the embodiments.

One or more embodiments may provide an electronic device wherein functional safety is provided by re-using cryptographic processing circuit blocks for performing functional tests.

One or more embodiments may thus facilitate matching automotive-grade functional safety requirements (e.g., ASIL-B compliant) in cryptographic hardware, such as hardware security modules.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
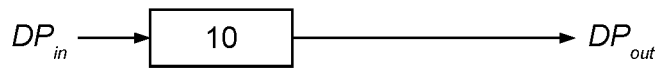
FIG. 1 is a block diagram exemplary of a cryptographic processor.

By way of introduction to a detailed description of exemplary embodiments, reference may first be had to FIG. 1, illustrating a block diagram exemplary of a cryptographic processor 10. In some applications as exemplified in FIG. 1, a cryptographic processor 10 may be configured to receive input data packets $DP_{in}$ and to process the input data packets $DP_{in}$ applying thereto certain cryptographic processing (e.g., a certain cryptographic function), thereby generating output data packets $DP_{out}$. In such case, possible random faults affecting the processor 10 may not be detected, insofar as the output data packets $DP_{out}$ are not checked for correctness.

Figure 2:
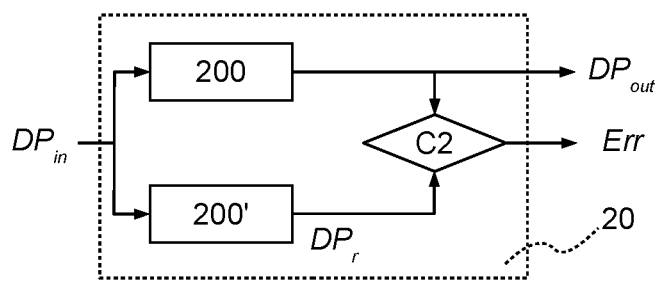
FIG. 2 is a block diagram exemplary of a cryptographic processor with hardware redundancy.

A conventional solution for improving robustness against possible hardware faults (e.g., to reach a certain functional safety target for Failure in Time, FIT, requirements) is exemplified by a cryptographic processor 20 as illustrated in FIG. 2, wherein a redundant processing unit 200' is configured to receive the same input data packets $DP_{in}$ and applying thereto the same cryptographic processing as a main processing unit 200. A comparison between the output data packets $DP_{out}$ generated by the main processing unit 200 and the output data packets $DP_{r}$ generated by the redundant processing unit 200' is exemplified by block C2 in FIG. 2 (implemented, for instance, in a microprocessor included in the cryptographic processor 20).

As a result of the comparison act C2, an error flag Err may be asserted (e.g., produced) if the main processing unit 200 and the redundant processing unit 200' provide different output data packets, thereby indicating a possible hardware fault in the cryptographic processor 20 (e.g., a bit flip or a stuck-at fault in the main processing unit 200 or in the redundant processing unit 200') and the possible corruption of the output data packets $DP_{out}$.

Cryptographic processors implementing redundant hardware as exemplified in FIG. 2 may be advantageous in that hardware faults may be detected with low latency, since the main processing unit 200 and the redundant processing unit 200' may operate simultaneously (e.g., in parallel). However, such solutions may be expensive, insofar as robustness is achieved by overdesigning the cryptographic processor 20 (e.g., doubling the hardware).

Other conventional solutions for improving robustness against hardware faults may involve implementing cyclic redundancy check (CRC) methods.

Some cryptographic processors, such as hardware security modules, may involve cryptographic functions having an intrinsic self-consistency check for data security purposes. This may be the case, for instance, for secure transactions involving signature algorithms aiming at detecting possible data manipulation by third parties during data transmission.

One or more embodiments may rely on such cryptographic functions for functional safety purposes, i.e., for detection of random hardware faults.

Figure 3:
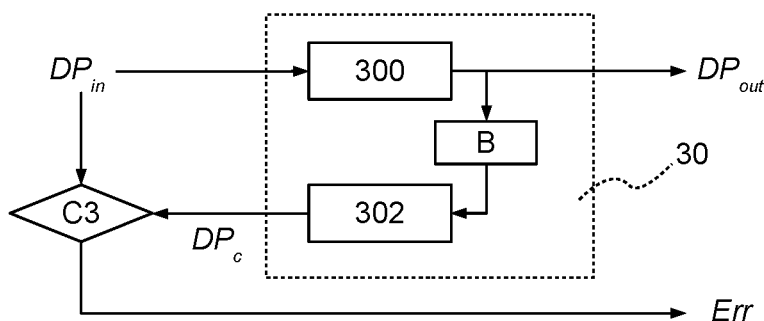
FIG. 3 is a block diagram exemplary of an electronic device according to embodiments.

For instance, FIG. 3 is a block diagram exemplary of an electronic device 30 (e.g., a hardware security module) according to one or more embodiments, comprising a first cryptographic processing unit 300 configured to perform a certain cryptographic function on received input data packets $DP_{in}$, and a second cryptographic processing unit 302 configured to perform a cryptographic function which is the inverse of the cryptographic function performed by the first processing unit 300.

The second processing unit 302 may be configured to receive at input the data packets $DP_{out}$ generated at the output of the first processing unit 300, with said data packets $DP_{out}$ preferably being buffered in a buffer B between the first processing unit 300 and the second processing unit 302.

As exemplified in FIG. 3, functional safety may be implemented by performing a comparison act C3 between the input data packets $DP_{in}$ and the data packets $DP_c$ generated at the output of the second processing unit 302, i.e., the data packets obtained by encrypting and subsequently decrypting the input data packets $DP_{in}$, which are therefore expected to be equal to the input data packets $DP_{in}$ in the absence of hardware faults within the electronic device 30.

In one or more embodiments as exemplified in FIG. 3, a satisfactory robustness against random hardware faults may be achieved, insofar as the probability of a single random hardware fault generating a valid encryption/decryption flow (i.e., the probability of having a functional fault in the first processing unit 300 resulting in $DP_c=DP_{in}$) may be low enough to meet a certain target safety coverage (fault coverage), for instance, a safety coverage equal to 99%.

Depending on the targeted level of functional safety, one or more embodiments may operate according to different schemes. In case the level of safety is high, the data packets $DP_{out}$ may be provided at the output of the device 30 only after the comparison act C3 is found to have a positive outcome (i.e., only if $DP_c=DP_{in}$, with Err=0). In case of a lower level of safety, the data packets $DP_{out}$ may be provided at the output of the device 30 immediately after cryptographic processing in the first cryptographic processing unit 300 is terminated, with a "deferred" error flag Err being asserted in case of negative outcome of the comparison act C3 (i.e., if $DP_c \neq DP_{in}$, with Err=1) to indicate that the output data $DP_{out}$ previously provided may be corrupted.

One or more embodiments may not require redundant hardware specifically implemented for functional safety purposes, insofar as the processing units (e.g., hardware accelerators) 300 and/or 302 may be already present in the device 30 for different purposes (e.g., for implementing data security functions), and/or the comparison act C3 may be software-implemented in a main microprocessor of the device 30.

Therefore, one or more embodiments may involve reconfiguring a hardware security module to operate as discussed with reference to FIG. 3 for functional safety purposes, without involving dedicated hardware.

Software-implemented comparison C3 of data packets $DP_{in}$ and $DP_c$ may turn out to be sophisticated and computationally demanding, since the data packets may be large, e.g., having a size of some megabytes (MB). Thus, comparing said entire data packets may result in additional latency as well as memory bandwidth occupation.

Figure 4:
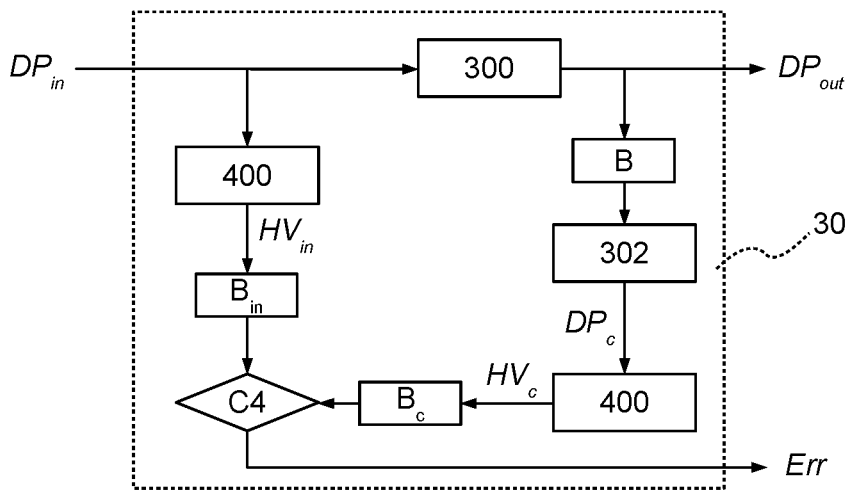
FIG. 4 is a further block diagram exemplary of an electronic device according to embodiments.

One or more embodiments as exemplified in FIG. 4 may reduce the computational effort of a functional safety procedure implemented in a device as previously described.

Compared to embodiments as exemplified in FIG. 3, embodiments as exemplified in FIG. 4 may involve using an additional hardware accelerator 400 in the device 30 (e.g., again a hardware security module), the additional hardware accelerator 400 being configured to implement a hash function.

In particular, an input data packet $DP_{in}$ may be provided in parallel (e.g., at the same time) to the first cryptographic processing unit 300 and to the hash hardware accelerator 400. The hash accelerator 400 may generate a hash value $HV_{in}$ (e.g., a 256-bit hash value) corresponding to the input data packet $DP_{in}$, the hash value $HV_{in}$ being optionally stored in a buffer Bin. The first processing unit 300 may generate an encrypted data packet $DP_{out}$, which may optionally be stored in a buffer B, and subsequently provided to the second processing unit 302 to generate a decrypted data packet $DP_c$. The hash accelerator 400 may thus generate a hash value $HV_c$ (e.g., a 256-bit hash value) corresponding to the decrypted data packet $DP_c$ by applying said hash function to the decrypted data packet $DP_c$, the hash value $HV_c$ being optionally stored in a buffer $B_c$.

A comparison act C4 between the hash values $HV_{in}$ and $HV_c$ may be performed by a microprocessor in the device 30 (e.g., a main microprocessor running the firmware of the device 30), to generate an error flag Err indicating whether the two hash values are equal (e.g., resulting in Err=0) or not (e.g., resulting in Err=1).

Advantageously with respect to other embodiments, comparing hash values $HV_{in}$, $HV_c$ instead of comparing data packets $DP_{in}$, $DP_c$ may result in a lower computational effort, and in reduced latency.

The hash hardware accelerator 400 may be present in the device 30 for different purposes, so that one or more embodiments may involve configuring a hardware security module 30 to re-use the hardware accelerator blocks 300, 302, 400 to perform functional safety functions in addition to their conventional operation, without significant impact on the hardware design of the device 30.

In one or more embodiments, the device 30 may thus be programmed so to allow two different operation modes.

In a first operation mode, the device 30 may operate without implementing functional safety checks, i.e., may receive input data packets $DP_{in}$, apply cryptographic processing thereto, and provide output data packets $DP_{out}$. In a second operation mode, the device 30 may implement functional safety checks as exemplified in FIG. 3 or 4, providing output data packets $DP_{out}$ and an error signal Err indicative of whether the functional safety check for the current output data packet $DP_{out}$ was successful (e.g., Err=0) or not (e.g., Err=1).

One or more embodiments may additionally involve checking (e.g., periodically) the functionality of the second cryptographic processing unit 302 and/or of the hash processor 400 against so-called "latent" hardware faults (e.g., permanent faults), i.e., hardware faults affecting the safety hardware itself. For instance, checking for latent hardware faults may be performed at each boot of the device 30.

For instance, one or more embodiments may comprise (periodically) providing at the input of the hash processor 400 at least one known data packet $DP_{test}$ (e.g., permanently stored in a local memory or register in the device 30) whose corresponding at least one hash value $HV_{test}$ is known in advance (pre-calculated). The output generated by the hash processor 400 upon reception of the at least one known data packet $DP_{test}$ may be compared with the expected result $HV_{test}$ to determine whether the hash processor 400 is affected by a fault.

One or more embodiments may comprise (periodically) providing at the input of the second cryptographic processing unit 302 at least one pre-encrypted data packet $DP_{enc}$ (e.g., permanently stored in a local memory or register in the device 30) whose corresponding at least one decrypted data packet $DP_{dec}$ is known in advance. The output generated by the second cryptographic processing unit 302 upon reception of the at least one pre-encrypted data packet $DP_{enc}$ may be compared with the expected result $DP_{dec}$ to determine whether the second cryptographic processing unit 302 is affected by a fault.

One or more embodiments may comprise checking correctness of key loading in the first and/or second cryptographic processing unit 300, 302 by providing pre-defined input encryption/decryption patterns. By way of example, a set of data packets may be sent for encryption after loading the key(s), and the outcome of such encryption may be checked against a pre-encrypted set of data packets that is stored in a memory.

Therefore, one or more embodiments may provide functional safety to a hardware security module (e.g., to realize automotive ASIL-B compliant hardware security modules) without implementing dedicated, redundant hardware.

Additionally, one or more embodiments may provide a flexible solution which may selectively operate without functional safety procedures (at low latency) or with functional safety procedures (with a small increase in latency).

As exemplified herein, an electronic device (e.g., 30) such as a hardware security module device may comprise a first cryptographic processing circuit (e.g., 300) configured to receive input data packets (e.g., $DP_{in}$) and apply thereto a first cryptographic processing to provide output data packets (e.g., $DP_{out}$), a second cryptographic processing circuit (e.g., 302) configured to receive (e.g., B) said output data packets, apply thereto a second cryptographic processing, said second cryptographic processing being inverse to said first cryptographic processing, and provide comparison data packets (e.g., $DP_c$) as a result of applying said second cryptographic processing to said output data packets received, and a comparison processing circuit (e.g., C3; 400, C4) configured to compare said input data packets with said comparison data packets, and to produce an error signal (e.g., Err) as a result of said input data packets being different from said comparison data packets.

As exemplified herein, the first cryptographic processing circuit may be coupled to said comparison processing circuit to receive said error signal, and may be configured to transmit said output data packets from the electronic device as a result of receiving from the comparison processing circuit said error signal being indicative of said input data packets being equal to said comparison data packets.

As exemplified herein, the first cryptographic processing circuit may be configured to transmit said output data packets from the electronic device irrespective of said comparison processing circuit producing said error signal indicative of said input data packets being different from said comparison data packets, and the comparison processing circuit may be configured to transmit from the electronic device a warning signal coupled to the output data packets transmitted from the electronic device as a result of said input data packets being found to be different from said comparison data packets.

As exemplified herein, the comparison processing circuit may comprise a microprocessor (e.g., C3) configured to produce said error signal as a result of comparing bitwise said input data packets with said comparison data packets.

As exemplified herein, the comparison processing circuit may comprise a hash processing circuit (e.g., 400) configured to receive said input data packets and apply thereto hash function processing to provide respective input hash values (e.g., $HV_{in}$), and receive said comparison data packets and apply thereto hash function processing to provide respective comparison hash values (e.g., $HV_c$), and the comparison processing circuit may comprise a microprocessor (e.g., C4) configured to compare said input hash values with said comparison hash values to produce said error signal.

As exemplified herein, the hash processing circuit may be configured to apply said hash function processing as cryptographic hash function processing.

As exemplified herein, the electronic device may comprise a memory configured to store at least one test data packet and at least one respective test hash value obtainable by applying said hash function processing to said at least one test data packet, and the electronic device may be configured to verify correct operation of the hash processing circuit by providing to the hash processing circuit said at least one test data packet to produce at least one output test hash value, and comparing said at least one output test hash value with said at least one respective test hash value stored in said memory.

As exemplified herein, the electronic device may comprise a memory configured to store at least one test encrypted data packet and at least one respective test decrypted data packet obtainable by applying said second cryptographic processing to said at least one test encrypted data packet, and the electronic device may be configured to verify correct operation of the second cryptographic processing circuit by providing to the second cryptographic processing circuit said at least one test encrypted data packet to produce at least one output test decrypted data packet, and comparing said at least one output test decrypted data packet with said at least one respective test decrypted data packet stored in said memory.

As exemplified herein, a method of operating an electronic device may comprise receiving at a first cryptographic processing circuit input data packets and applying thereto a first cryptographic processing to provide output data packets, receiving at a second cryptographic processing circuit said output data packets and applying thereto a second cryptographic processing, said second cryptographic processing being inverse to said first cryptographic processing, to provide comparison data packets, comparing, in a comparison processing circuit, said input data packets with said comparison data packets, and producing an error signal as a result of said input data packets being different from said comparison data packets.

Without prejudice to the underlying principles, the details and embodiments may vary, even significantly, with respect to what has been described by way of example only, without departing from the extent of protection.

The extent of protection is defined by the annexed claims.

What is claimed is:

1. An electronic device comprising:
    a first cryptographic processing circuit in the electronic device, configured to receive encrypted input data packets and to apply thereto a first cryptographic processing to provide decrypted output data packets;
    a second cryptographic processing circuit in the electronic device, configured to receive the decrypted output data packets, to apply thereto a second cryptographic processing, the second cryptographic processing being inverse to the first cryptographic processing, and to provide encrypted comparison data packets as a result of applying the second cryptographic processing to the received decrypted output data packets; and
    a comparison processing circuit configured to compare the encrypted input data packets with the encrypted comparison data packets, and to produce an error signal in response to the encrypted input data packets being different from the encrypted comparison data packets.

2. The electronic device of claim 1, wherein:
    the first cryptographic processing circuit is coupled to the comparison processing circuit to receive the error signal from the comparison processing circuit; and
    the first cryptographic processing circuit is configured to transmit the decrypted output data packets from the electronic device in response to receiving, from the comparison processing circuit, the error signal being indicative of the encrypted input data packets being equal to the encrypted comparison data packets.

3. The electronic device of claim 1, wherein:
    the first cryptographic processing circuit is configured to transmit the decrypted output data packets from the electronic device irrespective of the comparison processing circuit producing the error signal indicative of the encrypted input data packets being different from the encrypted comparison data packets; and
    the comparison processing circuit is configured to transmit from the electronic device a warning signal coupled to the decrypted output data packets transmitted from the electronic device in response to the encrypted input data packets being found to be different from the encrypted comparison data packets by the comparison processing circuit.

4. The electronic device of claim 1, wherein the comparison processing circuit comprises a microprocessor configured to produce the error signal in response to comparing bitwise the encrypted input data packets with the encrypted comparison data packets.

5. The electronic device of claim 1, wherein the comparison processing circuit comprises a hash processing circuit configured to:
    receive the encrypted input data packets and apply thereto hash function processing to provide respective input hash values; and
    receive the encrypted comparison data packets and apply thereto hash function processing to provide respective comparison hash values; and wherein the comparison processing circuit comprises a microprocessor configured to compare the input hash values with the comparison hash values to produce the error signal.

6. The electronic device of claim 5, wherein the hash processing circuit is configured to apply the hash function processing as cryptographic hash function processing.

7. The electronic device of claim 5, comprising a memory configured to store at least one test data packet and at least one respective test hash value obtainable by applying the hash function processing to the at least one test data packet, wherein the electronic device is configured to:
    provide to the hash processing circuit the at least one test data packet to produce at least one output test hash value; and
    compare the at least one output test hash value with the at least one respective test hash value stored in the memory.

8. The electronic device of claim 1, comprising a memory configured to store at least one test encrypted data packet and at least one respective test decrypted data packet obtainable by applying the second cryptographic processing to the at least one test encrypted data packet, wherein the electronic device is configured to:
    provide to the second cryptographic processing circuit the at least one test encrypted data packet to produce at least one output test decrypted data packet; and
    compare the at least one output test decrypted data packet with the at least one respective test decrypted data packet stored in the memory.

9. A method of operating an electronic device, the method comprising:
    receiving, at a first cryptographic processing circuit in the electronic device, encrypted input data packets;
    applying, by the first cryptographic processing circuit in the electronic device, to the encrypted input data packets a first cryptographic processing to provide decrypted output data packets;
    receiving, at a second cryptographic processing circuit in the electronic device, the decrypted output data packets;
    applying, by the second cryptographic processing circuit in the electronic device, to the decrypted output data packets a second cryptographic processing to provide encrypted comparison data packets, the second cryptographic processing being inverse to the first cryptographic processing;
    comparing, by a comparison processing circuit, the encrypted input data packets with the encrypted comparison data packets; and
    producing an error signal indicating whether the encrypted input data packets are different from the encrypted comparison data packets.

10. The method of claim 9, further comprising:
    receiving, by the first cryptographic processing circuit from the comparison processing circuit, the error signal; and
    transmitting, by the first cryptographic processing circuit, the decrypted output data packets from the electronic device in response to receiving, from the comparison processing circuit, the error signal being indicative of the encrypted input data packets being equal to the encrypted comparison data packets.

11. The method of claim 9, further comprising:
    transmitting, by the first cryptographic processing circuit, the decrypted output data packets from the electronic device irrespective of the comparison processing circuit producing the error signal indicative of the encrypted input data packets being different from the encrypted comparison data packets; and transmitting, by the comparison processing circuit, from the electronic device, a warning signal coupled to the decrypted output data packets transmitted from the electronic device in response to the encrypted input data packets being found to be different from the encrypted comparison data packets by the comparison processing circuit.

12. The method of claim 9, further comprising the comparison processing circuit using a microprocessor to produce the error signal in response to comparing bitwise the encrypted input data packets with the encrypted comparison data packets.

13. The method of claim 9, further comprising:

receiving, by a hash processing circuit of the comparison processing circuit, the encrypted input data packets;

applying to the encrypted input data packets, by the hash processing circuit, hash function processing to provide respective input hash values; and receiving, by the hash processing circuit, the encrypted comparison data packets; and applying to the encrypted comparison data packets, by the hash processing circuit, hash function processing to provide respective comparison hash values; and the comparison processing circuit using a microprocessor to compare the input hash values with the comparison hash values to produce the error signal.

14. The method of claim 13, further comprising applying, by the hash processing circuit, the hash function processing as cryptographic hash function processing.

15. The method of claim 13, further comprising;

storing, by a memory, at least one test data packet and at least one respective test hash value obtainable by applying the hash function processing to the at least one test data packet;

providing, to the hash processing circuit, the at least one test data packet to produce at least one output test hash value; and comparing the at least one output test hash value with the at least one respective test hash value stored in the memory.

16. The method of claim 9, further comprising:

storing, by a memory, at least one test encrypted data packet and at least one respective test decrypted data packet obtainable by applying the second cryptographic processing to the at least one test encrypted data packet;

providing, to the second cryptographic processing circuit, the at least one test encrypted data packet to produce at least one output test decrypted data packet; and comparing the at least one output test decrypted data packet with the at least one respective test decrypted data packet stored in the memory.

* * * * *